US009346323B2

(12) United States Patent
Sakamoto

(10) Patent No.: US 9,346,323 B2
(45) Date of Patent: May 24, 2016

(54) PNEUMATIC TIRE

(71) Applicant: The Yokohama Rubber Co., LTD., Minato-ku, Tokyo (JP)

(72) Inventor: Yousuke Sakamoto, Kanagawa (JP)

(73) Assignee: The Yokohama Rubber Co., LTD. (JP)

( * ) Notice: Subject to any disclaimer, the term of this patent is extended or adjusted under 35 U.S.C. 154(b) by 628 days.

(21) Appl. No.: 13/754,271

(22) Filed: Jan. 30, 2013

(65) Prior Publication Data

US 2013/0199684 A1    Aug. 8, 2013

(30) Foreign Application Priority Data

Feb. 2, 2012   (JP) .................................. 2012-021104

(51) Int. Cl.
*B60C 11/03*   (2006.01)
*B60C 11/13*   (2006.01)

(52) U.S. Cl.
CPC ......... *B60C 11/0306* (2013.04); *B60C 11/0304* (2013.04); *B60C 11/1369* (2013.04); *B60C 11/1392* (2013.04); *B60C 2011/0358* (2013.04); *B60C 2011/0365* (2013.04); *B60C 2011/0383* (2013.04); *B60C 2011/0388* (2013.04)

(58) Field of Classification Search
CPC ........ B60C 11/01; B60C 11/02; B60C 11/04; B60C 2011/0341; B60C 11/0304; B60C 11/033; B60C 11/1323; B60C 11/1392; B60C 2011/0353; B60C 2011/0365; B60C 2011/0367
USPC ................... 152/209.3, 209.8, 209.9, 209.18, 152/209.26, 209.27, 900, 901
See application file for complete search history.

(56) References Cited

U.S. PATENT DOCUMENTS

| 4,635,694 A * | 1/1987 | Hosokawa | B60C 11/0306 152/209.9 |
| 2010/0139826 A1* | 6/2010 | Matsumoto | B60C 11/0309 152/209.18 |
| 2010/0212792 A1* | 8/2010 | Mita | B60C 11/0306 152/209.9 |
| 2011/0061780 A1* | 3/2011 | Mita | B60C 11/1392 152/209.8 |

FOREIGN PATENT DOCUMENTS

| EP | 2 151 333 | 2/2010 |
| JP | 2010-215221 | 9/2010 |

OTHER PUBLICATIONS

Souza's Tire Service, "What Tire Sidewall Markings Mean", Aug. 2015 [http://www.souzastireservice.com/tires-101/tire-sidewall-markings.aspx].*

* cited by examiner

*Primary Examiner* — Eric Hug
(74) *Attorney, Agent, or Firm* — Thorpe North & Western

(57) ABSTRACT

A circumferential narrow groove of a pneumatic tire is disposed at a position that partitions an outer side second land portion and an outer side shoulder land portion. A center land portion is a rib that is continuous in a tire circumferential direction, and an inner side second land portion and the outer side second land portion are rows of blocks divided in the tire circumferential direction by pluralities of lug grooves. Additionally, a groove area ratio S2 of the center land portion, a groove area ratio S1 of the inner side second land portion, and a groove area ratio S3 of the outer side second land portion have a relationship such that S2<S3<S1. Moreover, a groove width Wd of the circumferential narrow groove and a maximum groove width Wmax of the other three circumferential main grooves to have a relationship such that $3.1 \leq Wmax/Wd \leq 5.0$.

19 Claims, 10 Drawing Sheets

CROSS-SECTION AT A

| | Conventional Example 1 | Conventional Example 2 | Working Example 1 | Working Example 2 | Working Example 3 | Working Example 4 | Working Example 5 | Working Example 6 |
|---|---|---|---|---|---|---|---|---|
| Circumferential narrow groove | Absent | Present | Present | Present | Present | Present | Present | Present |
| Center land portion/Second land portion | Block row/Block row | Rib/Rib | Rib/Block row | Rib/Block row | Rib/Block row | Rib/Block row | Rib/Block row | Rib/Block row |
| Groove area ratios S1, S2, and S3 | S1=S2=S3 | S1<S2<S3 | S2<S3<S1 | S2<S3<S1 | S2<S3<S1 | S2<S3<S1 | S2<S3<S1 | S2<S3<S1 |
| Wmax/Wd | 1.0 | 2.5 | 3.5 | 3.1 | 5.0 | 3.5 | 3.5 | 3.5 |
| Raised bottom portions in first lug grooves of inner side second land portion and outer side second land portion | Absent | - | Present | Present | Present | Absent | Present | Present |
| D1/W1 | - | - | 0.50 | 0.50 | 0.50 | - | 0.30 | 0.70 |
| Sipes of inner side second land portion | - | Absent | Present | Present | Present | Present | Present | Present |
| D2/W1 | - | 0.50 | 0.50 | 0.50 | 0.50 | 0.50 | 0.50 | 0.50 |
| D6/W4 | - | - | 0.50 | 0.50 | 0.50 | 0.50 | 0.50 | 0.50 |
| W5/W6 | - | - | 0.65 | 0.65 | 0.65 | 0.65 | 0.65 | 0.65 |
| Notches in inner side second land portion and center land portion | - | - | Present | Present | Present | Present | Present | Present |
| L2/L1 | - | - | 0.50 | 0.50 | 0.50 | 0.50 | 0.50 | 0.50 |
| Dry performance | 98 | 100 | 103 | 100 | 104 | 99 | 102 | 104 |
| Wet performance | 100 | 98 | 103 | 103 | 102 | 104 | 104 | 102 |

FIG. 8a

|  | Working Example 7 | Working Example 8 | Working Example 9 | Working Example 10 | Working Example 11 | Working Example 12 | Working Example 13 | Working Example 14 |
|---|---|---|---|---|---|---|---|---|
| Circumferential narrow groove | Present | Present | Present | Present | Present | Present | Present | Present |
| Center land portion/Second land portion | Rib/Block row | Rib/Block row | Rib/Block row | Rib/Block row | Rib/Block row | Rib/Block row | Rib/Block row | Rib/Block row |
| Groove area ratios S1, S2, and S3 | S2<S3<S1 | S2<S3<S1 | S2<S3<S1 | S2<S3<S1 | S2<S3<S1 | S2<S3<S1 | S2<S3<S1 | S2<S3<S1 |
| Wmax/Wd | 3.5 | 3.5 | 3.5 | 3.5 | 3.5 | 3.5 | 3.5 | 3.5 |
| Raised bottom portions in first lug grooves of inner side second land portion and outer side second land portion | Present | Present | Present | Present | Present | Present | Present | Present |
| D1/W1 | 0.50 | 0.50 | 0.50 | 0.50 | 0.50 | 0.50 | 0.50 | 0.50 |
| Sipes of inner side second land portion | Absent | Present | Present | Present | Present | Present | Present | Present |
| D2/W1 | 0.50 | 0.4 | 0.50 | 0.50 | 0.50 | 0.50 | 0.50 | 0.50 |
| D6/W4 | 0.50 | 0.50 | 0.50 | 0.40 | 0.60 | 0.50 | 0.50 | 0.50 |
| W5/W6 | 0.65 | 0.65 | 0.65 | 0.65 | 0.65 | 0.65 | 0.65 | 0.65 |
| Notches in inner side second land portion and center land portion | Present | Present | Present | Present | Present | Present | Present | Absent |
| L2/L1 | 0.50 | 0.50 | 0.50 | 0.50 | 0.50 | 0.45 | 0.55 | - |
| Dry performance | 103 | 104 | 103 | 100 | 104 | 102 | 103 | 104 |
| Wet performance | 102 | 100 | 103 | 102 | 102 | 103 | 102 | 102 |

FIG. 8b

PNEUMATIC TIRE

PRIORITY CLAIM

Priority is claimed to Japan Patent Application Serial No. 2012-21104 filed on Feb. 2, 2012.

BACKGROUND

1. Technical Field

The present technology relates to a pneumatic tire, and more particularly relates to a pneumatic tire by which both dry performance and wet performance are achieved.

2. Related Art

Conventionally, pneumatic tires with a tread portion including three circumferential main grooves, one circumferential narrow groove having a groove width that is less than that of the circumferential main grooves, and five rows of land portions partitioned and formed by the circumferential main grooves and the circumferential narrow groove are known (e.g. see FIG. 10). With this configuration, when the pneumatic tire is mounted on a vehicle such that the circumferential narrow groove side is on an outer side in the vehicle width direction, rigidity of the outer side region in the vehicle width direction of the tire is ensured and dry performance of the tire is enhanced. The technology described in Japanese Unexamined Patent Application Publication No. 2010-215221A is a conventional pneumatic tire that is configured in this manner.

However, summer tires for high-performance sport use of recent years have a problem in that both the dry performance and the wet performance of the tire need to be achieved.

SUMMARY

The present technology provides a pneumatic tire whereby both the dry performance and the wet performance of the tire can be achieved. A pneumatic tire according to the present technology includes a tread portion including three circumferential main grooves, one circumferential narrow groove having a groove width that is less than that of the circumferential main grooves, and one row of a center land portion, a pair of left and right second land portions, and a pair of left and right shoulder land portions partitioned and formed by the circumferential main grooves and the circumferential narrow groove. In such a pneumatic tire, the second land portion and the shoulder land portion in a first region demarcated by the center land portion are referred to as an "inner side second land portion" and an "inner side shoulder land portion", and the second land portion and the shoulder land portion in a second region are referred to as an "outer side second land portion" and an "outer side shoulder land portion". The circumferential narrow groove is disposed at a position that partitions the outer side second land portion and the outer side shoulder land portion. The center land portion is a rib that is continuous in a tire circumferential direction, and the inner side second land portion and the outer side second land portion are rows of blocks divided in the tire circumferential direction by a plurality of lug grooves. A groove area ratio $S2$ of the center land portion, a groove area ratio $S1$ of the inner side second land portion, and a groove area ratio $S3$ of the outer side second land portion have a relationship such that $S2<S3<S1$, and a groove width $Wd$ of the circumferential narrow groove and a maximum groove width $Wmax$ of the other three circumferential main grooves have a relationship such that $3.1 \leq Wmax/Wd \leq 5.0$.

With the pneumatic tire according to the present technology, (1) a groove area ratio $S2$ of the center land portion, a groove area ratio $S1$ of the inner side second land portion, and a groove area ratio $S3$ of the outer side second land portion have a relationship such that $S2<S3<S1$. Therefore, the rigidity of the center land portion and the rigidity of the outer side second land portion are increased, and the water drainage properties of the region that has the inner side second land portion are enhanced. Furthermore, (2) in the configuration having the groove area ratios $S1$ to $S3$ described above, a groove width $Wd$ of the circumferential narrow groove and a maximum groove width $Wmax$ of the other three circumferential main grooves have a relationship such that $3.1 \leq Wmax/Wd \leq 5.0$. Therefore, the rigidity of the region that has the circumferential narrow groove is increased. As a result, when the tire is mounted on a vehicle such that the region on the circumferential narrow groove side is on the outer side in the vehicle width direction, there is an advantage in that both the dry performance and the wet performance of the tire are achieved.

BRIEF DESCRIPTION OF THE DRAWINGS

FIGS. 8a-8b include a table showing results of performance testing of pneumatic tires according to embodiments of the present technology.

DETAILED DESCRIPTION

The present technology is described below in detail with reference to the accompanying drawing. However, the present technology is not limited to these embodiments. Moreover, constituents of the embodiment which can possibly or obviously be substituted while maintaining consistency with the present technology are included. Furthermore, a plurality of modified examples that are described in the embodiment can be freely combined within a scope of obviousness for a person skilled in the art.

Pneumatic Tire

Figure 1:
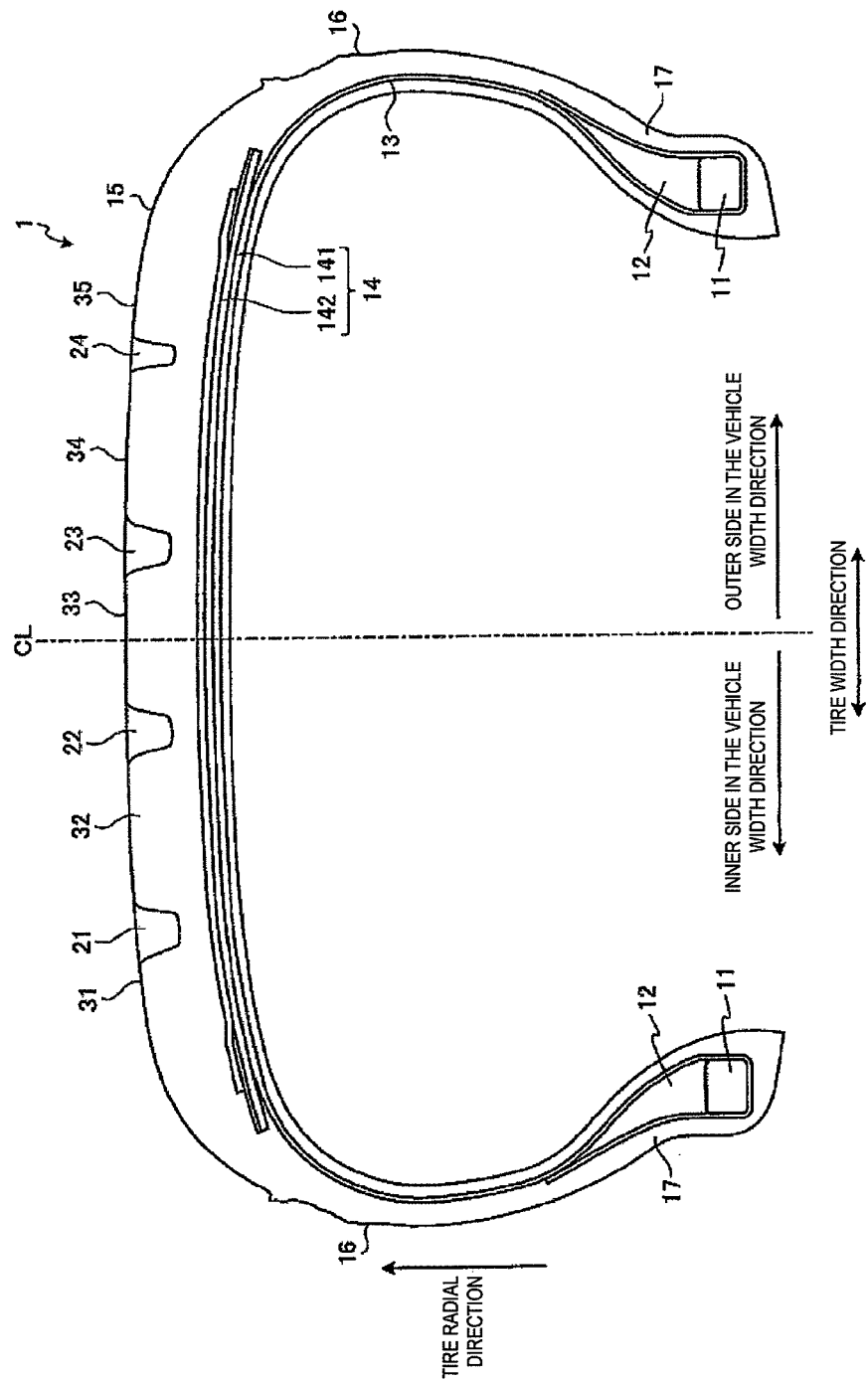
FIG. 1 is a cross-sectional view in a tire meridian direction illustrating a pneumatic tire according to an embodiment of the present technology.

FIG. 1 is a cross-sectional view in a tire meridian direction illustrating a pneumatic tire 1 according to an embodiment of the present technology. This drawing illustrates a radial tire for use on a passenger car as an example of the pneumatic tire 1. Note that the symbol CL refers to a tire equatorial plane.

The pneumatic tire 1 includes a pair of bead cores 11,11, a pair of bead fillers 12,12, a carcass layer 13, a belt layer 14, tread rubber 15, a pair of side wall rubbers 16,16, and a pair of rim cushion rubbers 17,17 (see FIG. 1).

The pair of bead cores 11,11 have annular structures and constitute cores of left and right bead portions. The pair of bead fillers 12,12 is disposed on a periphery of each of the pair of bead cores 11,11 in a tire radial direction so as to reinforce the bead portions.

The carcass layer 13 has a single-layer structure, and stretches between the left and right bead cores 11 and 11 in toroidal form, forming a framework for the tire. Additionally, both ends of the carcass layer 13 are folded toward an outer side in a tire width direction so as to envelop the bead cores 11 and the bead fillers 12, and fixed. Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to a tire circumferential direction), as an absolute value, of not less than 85° and not more than 95°.

The belt layer 14 is formed by stacking a pair of intersecting belts 141 and 142, and disposing the belts to extend over an outer circumference of the carcass layer 13. The pair of intersecting belts 141 and 142 are constituted by a plurality of belt cords formed from steel or organic fibers, covered by coating rubber, and subjected to a rolling process, having a belt angle of not less than 10° and not more than 30° (when expressed as an absolute value). Further, each of the belts of the pair of intersecting belts 141 and 142 has belt angles (inclination angle of in the fiber direction of the belt cord with respect to the tire circumferential direction) denoted with opposing signs, and the belts are stacked so as to intersect each other in the belt cord fiber directions (crossply configuration).

The tread rubber 15 is disposed on an outer circumference in the tire radial direction of the carcass layer 13 and the belt layer 14, and forms a tread portion of the tire. The pair of side wall rubbers 16,16 is disposed on each outer side of the carcass layer 13 in the tire width direction, an as to form left and right side wall portions of the tire. The pair rim cushion rubbers 17 and 17 is disposed on each outer side of the left and right bead cores 11 and 11 and the bead fillers 12 and 12 in the tire width direction so as to form left and right bead portions of the tire.

Figure 2:
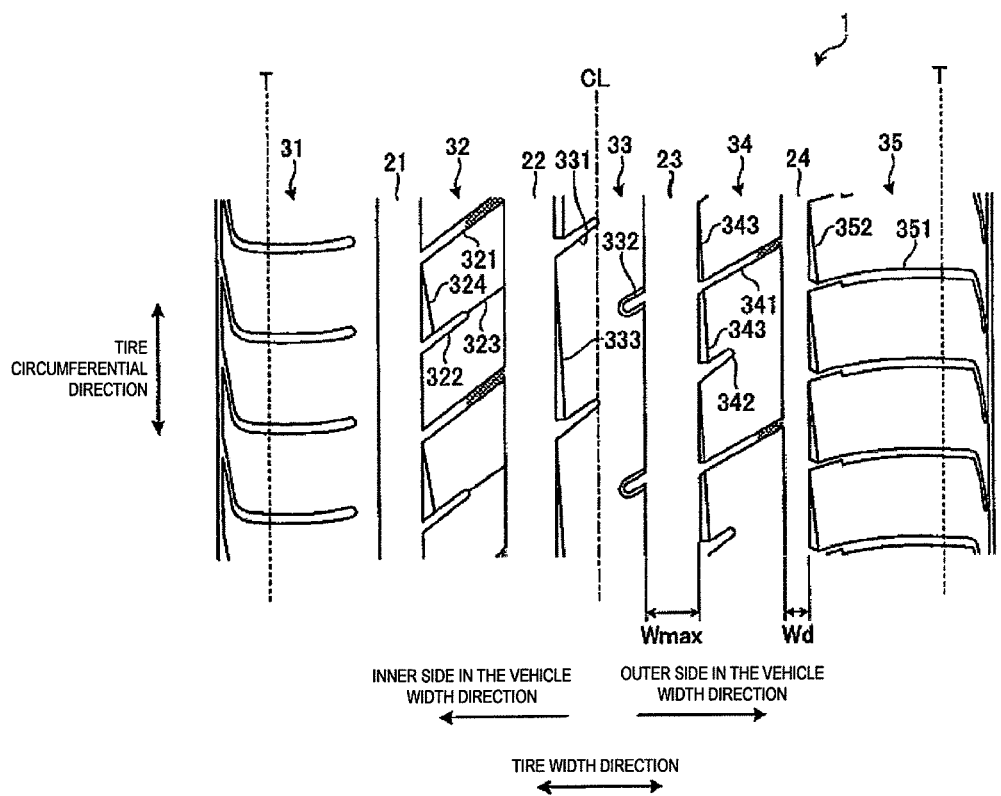
FIG. 2 is a plan view illustrating a tread surface of the pneumatic tire depicted in FIG. 1.

FIG. 2 is a plan view illustrating a tread surface of the pneumatic tire 1 depicted in FIG. 1. This drawing illustrates a tread pattern of a summer tire for sport use.

The pneumatic tire 1 includes three mutually adjacent circumferential main grooves 21 to 23, one circumferential narrow groove 24 that is narrower than the circumferential main grooves 21 to 23, and five rows of land portions 31 to 35 partitioned by the circumferential main grooves 21 to 23 and the circumferential narrow groove 24 in the tread portion (see FIG. 2).

In this case, the land portion 33 located in the center of the five land portions 31 to 35 is referred to as a "center land portion". This center land portion 33 is positioned on the tire equatorial plane CL. The left and right land portions 32 and 34 that are adjacent to the center land portion 33 are referred to as "second land portions". The left and right land portions 31 and 35 that are located outward in the tire width direction to the left and right of the second land portions 32 and 34, respectively, are referred to as "shoulder land portions".

Additionally, the second land portion 32 and the shoulder land portion 31 located in a first region demarcated by the center land portion 33 are referred to as an "inner side second land portion" and an "inner side shoulder land portion", respectively. The second land portion 34 and the shoulder land portion 35 located in a second region are referred to as an "outer side second land portion" and an "outer side shoulder land portion", respectively. The way in which these constituents are referred to relates to the mounting direction of the tire on a vehicle (described hereinafter).

With the configuration described in FIG. 2, each of the three circumferential main grooves 21 to 23 and the one circumferential narrow groove 24 is a straight groove extending in a linear manner in the tire circumferential direction. Moreover, the two circumferential main grooves 21 and 22, and the circumferential main groove 23 and the circumferential narrow groove 24 are disposed so as to be left-right symmetric around the tire equatorial plane CL. The circumferential narrow groove 24 is disposed at a position that partitions the outer side second land portion 34 and the outer side shoulder land portion 35. The center land portion 33 is a rib that is continuous in the tire circumferential direction, and the inner side second land portion 32 and the outer side second land portion 34 are rows of blocks divided in the tire circumferential direction by pluralities of lug grooves 321 and 341. Detailed explanations of the configurations of each of the land portions 31 to 35 are given below.

Note that "circumferential main grooves" refers to circumferential grooves having a groove width of 7.0 mm or greater. Moreover, "lug grooves" refers to lateral grooves having a groove width of 2.0 mm or greater. When measuring these groove widths, the notch and the chamfered portion formed in the groove opening portion are omitted, Additionally, hereinafter, "sipe" refers to a cut formed in a land portion, typically with a sipe width of less than 2.0 mm.

Mounting Direction of the Tire on a Vehicle

The pneumatic tire 1 has an indicator (not illustrated) designating a mounting direction on a vehicle wherein the region including the circumferential narrow groove 24 is on the outer side in the vehicle width direction. Note that the indicator of the mounting direction can be displayed, for example, by marks or recesses and protrusions provided on the side wall portion of the tire, or in a catalog that is attached to the tire.

Circumferential Narrow Groove

As described above, with the pneumatic tire 1, the circumferential narrow groove 24 is disposed at a position that partitions the outer side second land portion 34 and the outer side shoulder land portion 35, and has a groove width that is less than that of the three circumferential main grooves 21 to 23 (see FIG. 2). As a result, the rigidity of the region having the circumferential narrow groove 24 (region on the outer side in the vehicle width direction) is increased and the dry performance of the tire is enhanced.

In this case, a groove width Wd of the circumferential narrow groove 24 and a maximum groove width Wmax of the three circumferential main grooves 21 to 23 have a relationship such that $3.1 \le Wmax/Wd \le 5.0$ (see FIG. 2). This ratio Wmax/Wd is the ratio of the maximum groove width Wmax to the minimum groove width Wd of all of the circumferential grooves in the tread portion (the three circumferential main grooves 21 to 23 and the circumferential narrow groove 24).

For example, with the configuration of FIG. 2, the groove width of the circumferential main groove 23 that partitions the center land portion 33 and the outer side second land portion 34 is greatest in terms of width (i.e. is the maximum groove width Wmax), the groove width of the circumferential main groove 22 that partitions the center land portion 33 and the inner side second land portion 32 is next in terms of width, the groove width of the circumferential main groove 21 that partitions the inner side second land portion 32 and the inner side shoulder land portion 31 is next in terms of width, and the groove width Wd of the circumferential narrow groove 24 is the smallest. Moreover, the groove width of the circumferential main groove 21 that partitions the inner side second land portion 32 and the inner side shoulder land portion 31 is configured to be not less than 2.0 times the groove width Wd of the circumferential narrow groove 24.

Groove area ratio of the center land portion and the second land portions

In the pneumatic tire 1, a groove area ratio S2 of the center land portion 33, a groove area ratio S1 of the inner side second land portion 32, and a groove area ratio S3 of the outer side second land portion 34 have a relationship such that S2<S3<S1 (see FIG. 2). That is, the groove area ratio S2 of the center land portion 33 that is a rib is the smallest and the groove area ratio S1 of the inner side second land portion 32 is the greatest among the three rows of land portions 32 to 34 in the center region of the tread portion. With this configuration, when the tire is mounted on a vehicle such that the circumferential narrow groove 24 is on the outer side in the vehicle width direction, the rigidity of the region on the outer side in the vehicle width direction (the region having the center land portion 33 and the outer side second land portion 34) is ensured. Additionally, the water drainage properties of the region on the inner side in the vehicle width direction (the region having the inner side second land portion 32) are ensured. As a result, both tire dry performance and wet performance are achieved.

Additionally, with the configuration described above, the groove area ratios S1 to S3 preferably have relationships such that $1.05 \leq S3/S2$ and $1.05 \leq S1/S3$. As a result, the relationships between the groove area ratios S1 to S3 are made appropriate.

Here, "groove area ratio" is defined as groove area/(groove area+ground contact area). "Groove area" refers to the opening area of the grooves in the contact patch. "Groove" refers to the circumferential grooves and the lug grooves in the tread portion and does not include sipes, kerfs, and notches. "Ground contact area" refers to the contact area between the land portions and the contact surface. Note that the groove area and the ground contact area are measured at a contact surface between a tire and a flat plate in a configuration in which the tire is assembled on a standard rim, filled to a prescribed internal pressure, placed perpendicularly with respect to the flat plate in a static state, and loaded with a load corresponding to a prescribed load.

Herein, "standard rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Regular internal pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 1.80 kPa, and the regular load is 88% of the maximum load capacity.

Inner Side Second Land Portion and Center Land Portion

Figure 3:
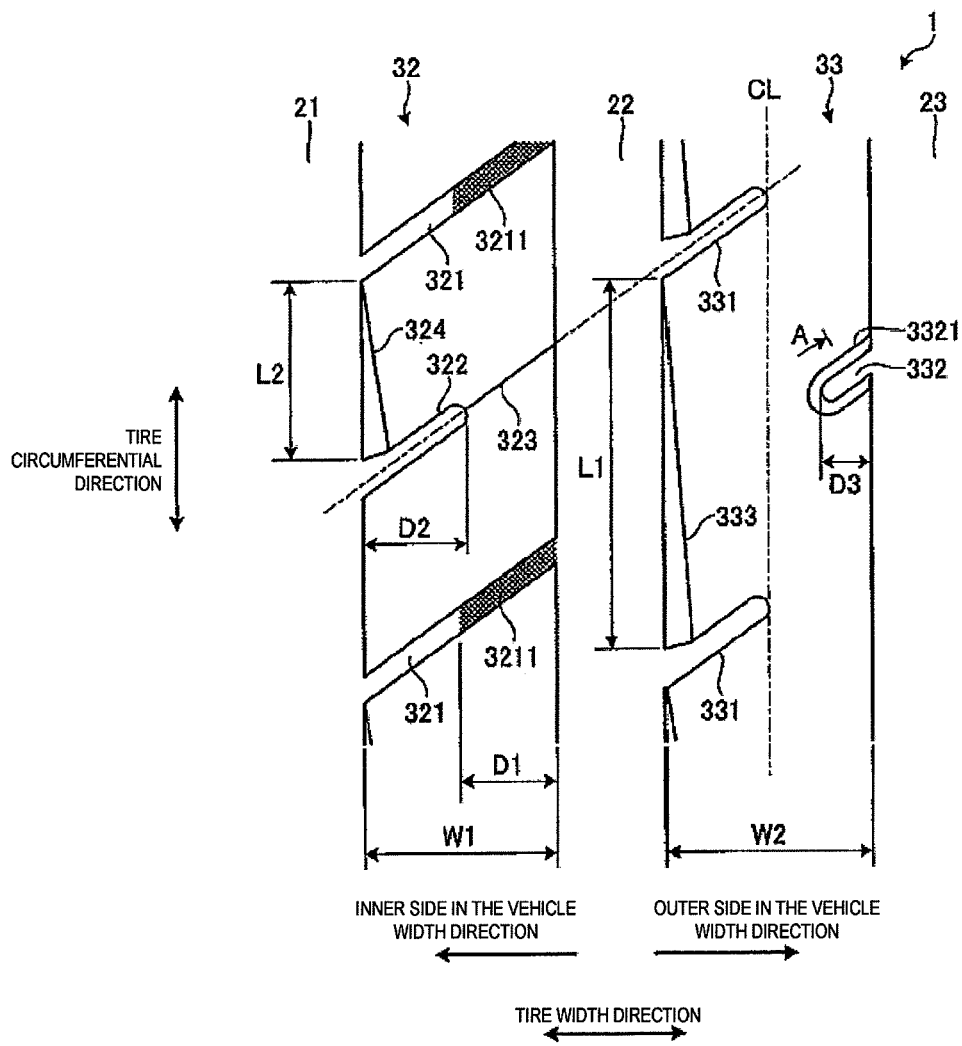
FIG. 3 is an explanatory drawing illustrating an inner side second portion and a center land portion of the pneumatic tire depicted in FIG. 1.
Figure 4:
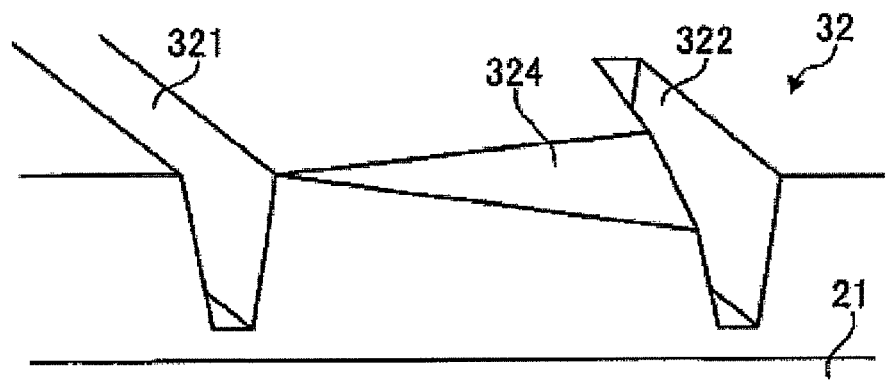
FIG. 4 is a perspective view illustrating a notch in the inner side second land portion depicted in FIG. 3.
Figure 5:
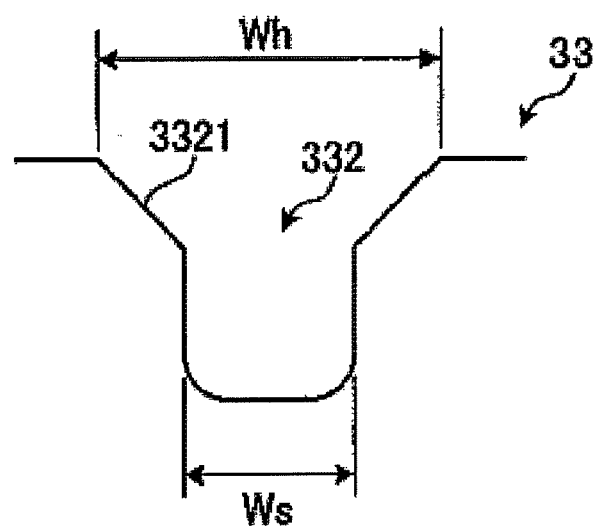
FIG. 5 is a cross-sectional view at A illustrating a notch groove of the center land portion depicted in FIG. 3.

FIG. 3 is an explanatory drawing illustrating the inner side second land portion 32 and the center land portion 33 of the pneumatic tire 1 depicted in FIG. 1, FIG. 4 is a perspective view illustrating a notch 324 in the inner side second land portion 32 depicted in FIG. 3. FIG. 5 is a cross-sectional view at A illustrating a notch groove 332 of the center land portion 33 depicted in FIG. 3.

In the pneumatic tire 1, the inner side second land portion 32 includes a plurality of first lug grooves 321, a plurality of second lug grooves 322, a plurality of sipes 323, and a plurality of notches 324 (see FIG. 3).

The first lug grooves 321 have an open structure and penetrate the inner side second land portion 32 so as to communicate with the left and right circumferential main grooves 21 and 22. Additionally, the plurality of first lug grooves 321 is disposed at a predetermined spacing in the tire circumferential direction and, therefore, the inner side second land portion 32 is a block row that is divided in the tire circumferential direction. For example, with the configuration of FIG. 3, the first lug grooves 321 are straight grooves extending in the tire width direction while inclining at a predetermined angle with respect to the tire circumferential direction.

Additionally, the first grooves 321 have raised bottom portions 3211 (see FIG. 3). The raised bottom portions 3211 are portions where a groove depth of the first lug grooves 321 is not less than 15% and not more than 45% of a maximum groove depth of the first lug grooves 321. The raised bottom portions 3211 are disposed in a region from an edge portion on the center land portion 33 side to a predetermined position within the inner side second land portion 32, and function to raise the groove bottom of the first lug grooves 321. Specifically, a distance D1 in the tire width direction of the disposal region of the raised bottom portions 3211 and a width W1 of the inner side second land portion 32 have a relationship such that $0.30 \leq D1/W1 \leq 0.70$.

The second lug grooves 322 have a semi-closed structure that is open to an edge portion on the inner side shoulder land portion 31 side of the inner side second land portion 32 and that terminates within the inner side second land portion 32 (see FIG. 3). Additionally, the plurality of the second lug grooves 322 is disposed at a predetermined spacing in the tire circumferential direction. A length D2 in the tire width direction of the second lug grooves 322 and the width of the inner side second land portion 32 have a relationship such that $0.40 \leq D2/W1 \leq 0.60$.

The plurality of first lug grooves 321 and the plurality of second lug grooves 322 are disposed so as to co-exist at a predetermined spacing in the tire circumferential direction (see FIG. 2). For example, with the configuration of FIG. 2, the first lug grooves 321 and the second lug grooves 322 are disposed so as to alternate, having a predetermined spacing in the tire circumferential direction. However, the configuration is not limited thereto and, for example, two of the first lug grooves 321 and one of the second lug grooves 322 may be disposed so as to alternate, having a predetermined spacing in the tire circumferential direction (not illustrated). With this configuration, more of the open structure first lug grooves 321 will be disposed than the second lug grooves 322 and, as a result, the water drainage properties of the tire will be enhanced. On the other hand, one of the first lug grooves 321 and two of the second lug grooves 322 may be disposed so as to alternate, having a predetermined spacing in the tire circumferential direction (not illustrated). With this configuration, more of the semi-closed structure second lug grooves 322 will be disposed than the first lug grooves 321 and, as a result, the dry performance of the tire will be enhanced. Thus, the disposal ratios of the first lug grooves 321 and the second tug grooves 322 can be appropriately set according to the specifications of the tire.

The sipes 323 are disposed so as to connect the second lug grooves 322 and the edge portion on the center land portion 33 side of the inner side second land portion 32 (see FIG. 3). For example, with the configuration of FIG. 3, the sipes 323 extend along extended lines of the second lug grooves 322 from terminating portions of the second lug grooves 322, and are open to the circumferential main groove 22.

The notches 324 are disposed in the edge portion on the inner side shoulder land portion 31 side of the inner side second land portion 32 (see FIG. 3). The notches 324 have a shape of a pyramid-like form notched in the edge portion of the inner side second land portion 32 (see FIG. 4). Additionally, the plurality of the notches 324 is disposed with a predetermined spacing in the tire circumferential direction (see FIG. 2). For example, with the configuration of FIG. 2, the edge portion of the inner side second land portion 32 is divided in the tire circumferential direction by the plurality of the first lug grooves 321 and the plurality of the second lug grooves 322. Moreover, the notch 324 is disposed in every other segment of the divided edge portion of the inner side second land portion 32. As a result, sections that have the notch 324 and sections that do not have the notch 324 are disposed in an alternating manner. Additionally, the notches 324 are disposed from the second lug grooves 322 to the first lug grooves 321 such that a notched width thereof narrows from the second lug groove 322 toward the first lug groove 321.

In the pneumatic tire 1, the center land portion 33 includes a plurality of lug grooves 331, a plurality of notch grooves 332, and a plurality of notches 333 (see FIG. 3).

The lug grooves 331 have a semi-closed structure that is open to the edge portion on the inner side second land portion 32 side of the center land portion 33 and that terminates within the center land portion 33. Additionally, the lug grooves 331 are disposed along extended lines of the second lug grooves 322 of the inner side second land portion 32.

In this case, it is sufficient that the lug grooves 331 of the center land portion 33 are substantially on the extended lines of the second lug grooves 322 of the inner side second land portion 32. Thus, the lug grooves 331 of the center land portion 33 may be disposed offset in the tire circumferential direction of the extended lines of the second lug grooves 322 of the inner side second land portion 32 (not illustrated). Specifically, a distance (offset amount, not illustrated) in the tire circumferential direction between the lug grooves 331 of the center land portion 33 and the extended lines of the second lug grooves 322 of the inner side second land portion 32 is preferably within ±50% and more preferably within ±20% of a width W2 of the center land portion 33. That is, provided that disposal is within the range described above, the lug grooves 331 of the center land portion 33 can be said to be substantially on the extended lines of the second lug grooves 322 of the inner side second land portion 32.

The notch grooves 332 are open to the edge portion on the outer side second land portion 34 side of the center land portion 33 and terminate within the center land portion 33 (see FIG. 3). Additionally, a length D3 in the tire width direction of the notch grooves 332 and the width W2 of the center land portion 33 have a relationship such that $0.15 \leq D3/W2 \leq 0.35$.

The notch grooves 332 have a chamfered portion 3321 that surrounds the groove opening portion of the notch grooves 332. For example, with the configuration of FIG. 3, the notch grooves 332 have a chamfered portion 3321 that is formed throughout an entire periphery of the notch grooves 332 along the groove opening portion and that surrounds the terminating portion of the notch grooves 332 in an arc-like manner. Additionally, as illustrated in FIG. 3, the chamfered portion 3321 is a C chamfer formed in the edge portion of the road contact surface and the groove wall surface of the center land portion 33. Moreover, a groove width Ws of the notch grooves 332 and a width Wh of the chamfered portion 3321 have a relationship such that $2.0 \leq Wh/Ws \leq 3.0$. The notch grooves 332 having the chamfered portion 3321 described above are preferable and advantageous because the water drainage properties can be enhanced while suppressing declines in the rigidity of the center land portion 33.

The notches 333 are disposed in the edge portion on the inner side second land portion 32 side of the center land portion 33 (see FIG. 3). Additionally, a length L2 in the tire circumferential direction of the Botches 324 of the inner side second land portion 32 and a length L1 in the tire circumferential direction of the notches 333 of the center land portion 33 have a relationship such that $0.45 \leq L2/L1 \leq 0.55$. For example, with the configuration of FIG. 3, the disposal spacing of the first lug grooves 321 of the inner side second land portion 32 and the disposal spacing of the lug grooves 331 of the center land portion 33 are configured to be equal. As a result, a total length of the notches 324 in the inner side second land portion 32 and a total length of the notches 333 of the center land portion 33 per unit pitch of the tire are configured to be not less than 0.45 and not more than 0.55.

Outer Side Second Land Portion and Outer Side Shoulder Land Portion

Figure 6:
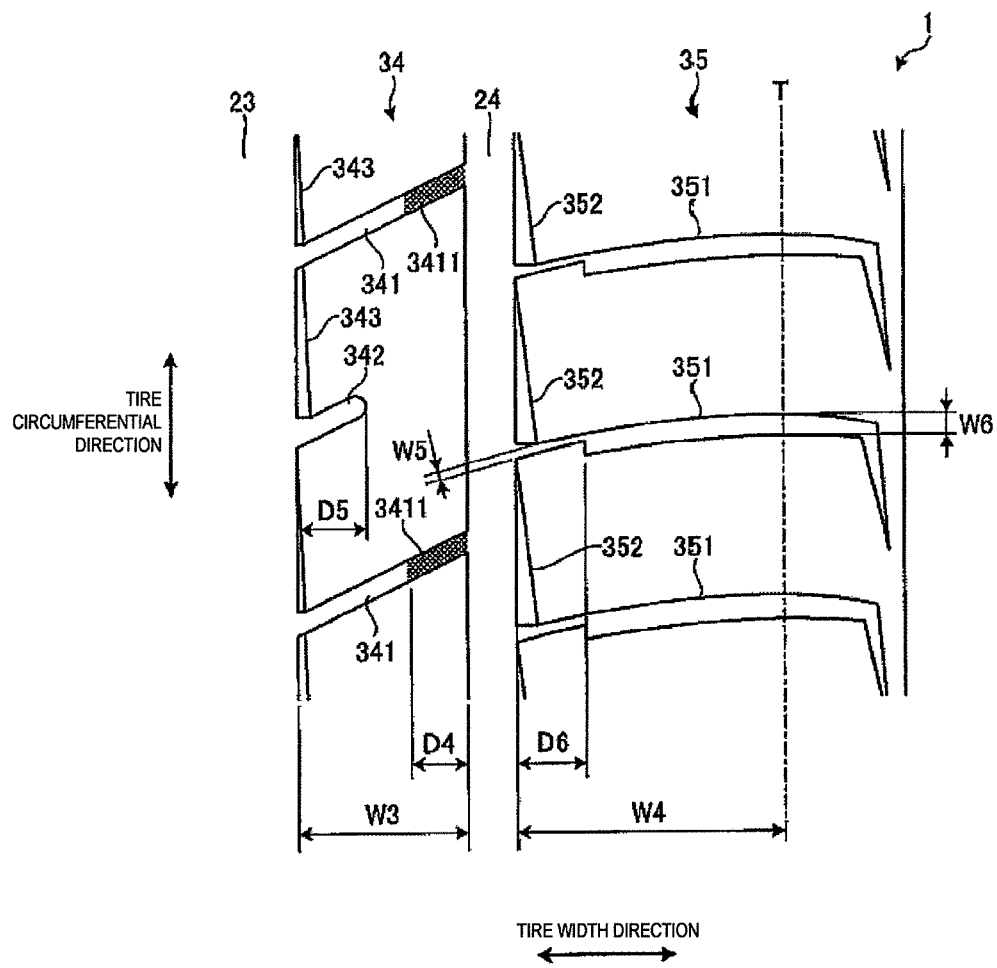
FIG. 6 is an explanatory drawing illustrating an outer side second land portion and an outer side shoulder land portion of the pneumatic tire depicted in FIG. 1.

FIG. 6 is an explanatory drawing illustrating the outer side second land portion 34 and the outer side shoulder land portion 35 of the pneumatic tire 1 depicted in FIG. 1.

In the pneumatic tire 1, the outer side second land portion 34 includes first lug grooves 341, second lug grooves 342, and notches 343 (see FIG. 6).

The first lug grooves 341 have an open structure and penetrate the outer side second land portion 34 so as to communicate with the circumferential main groove 23 and the circumferential narrow groove 24. Additionally, a plurality of the first lug grooves 341 is disposed at a predetermined spacing in the tire circumferential direction and, therefore, the outer side second land portion 34 is a block row that is divided in the tire circumferential direction. For example, with the configuration of FIG. 6, the first lug grooves 341 are straight grooves extending in the tire width direction while inclining at a predetermined angle with respect to the tire circumferential direction.

Additionally, the first lug grooves 341 have raised bottom portions 3411 (see FIG. 6). The raised bottom portions 3411 are portions where a groove depth of the first lug grooves 341 is not less than 20% and not more than 60% of the maximum groove depth of the first lug grooves 341. The raised bottom portions 3411 are disposed in a region from an edge portion on the outer side shoulder land portion 35 side of the outer side second land portion 34 to a predetermined position within the outer side second land portion 34, and function to raise the groove bottom of the first lug grooves 341. Specifically, a distance D4 in the tire width direction of the disposal region of the raised bottom portions 3411 and a width W3 of the outer side second land portion 34 have a relationship such that $0.20 \leq D4/W3 \leq 0.50$.

The second lug grooves 342 have a semi-closed structure that is open to an edge portion on the center land portion 33 side of the outer side second land portion 34 and that terminates within the outer side second land portion 34 (see FIG. 6). Additionally, a plurality of the second lug grooves 342 is disposed at a predetermined spacing in the tire circumferential direction. A length D5 in the tire width direction of the second lug grooves 342 and the width W3 of the outer side second land portion 34 have a relationship such that $0.25 \leq D5/W3 \leq 0.45$.

The notches 343 are disposed in the edge portion on the center land portion 33 side of the outer side second land portion 34 (see FIG. 6). The notches 343 have a shape of a pyramid-like form notched in the edge portion of the outer side second land portion 34. Note that in the configuration of FIG. 6, the notches 343 are disposed throughout the entirety of the edge portion of the outer side second land portion 34.

In the pneumatic tire 1, the outer side should land portion 35 includes lug grooves 351 and notches 352 (see FIG. 6).

The lug grooves 351 have an open structure extending in the tire width direction from the edge portion on the circumferential narrow groove 24 side of the outer side shoulder land portion 35 beyond a tire ground contact edge T. A distance W4 in the tire width direction from the edge portion on the circumferential narrow groove 24 side of the outer side shoulder land portion 35 to the tire ground contact edge T, a groove width W5 of the lug grooves 351 in a region from the edge portion on the circumferential narrow groove 24 side of the outer side shoulder land portion 35 to a distance D6 in the tire width direction, and a groove width W6 of the lug grooves 351 in the tire ground contact edge T have relationships such that $0.10 \leq D6/W4 \leq 0.55$ and $0.55 \leq W5/W6 \leq 0.75$. Thus, the lug grooves 351 have a structure in which the groove width is narrowed at an end thereof on the circumferential narrow groove 24 side.

Additionally, the "tire ground contact edge T" refers to the maximum width position in a tire axial direction of a contact surface between the tire and a flat plate in a configuration in which the tire is assembled on a regular rim, filled with regular inner pressure, placed perpendicularly to the flat plate in a static state, and loaded with a load corresponding to a regular load.

Center Land Portion and Outer Side Second Land Portion

Figure 7:
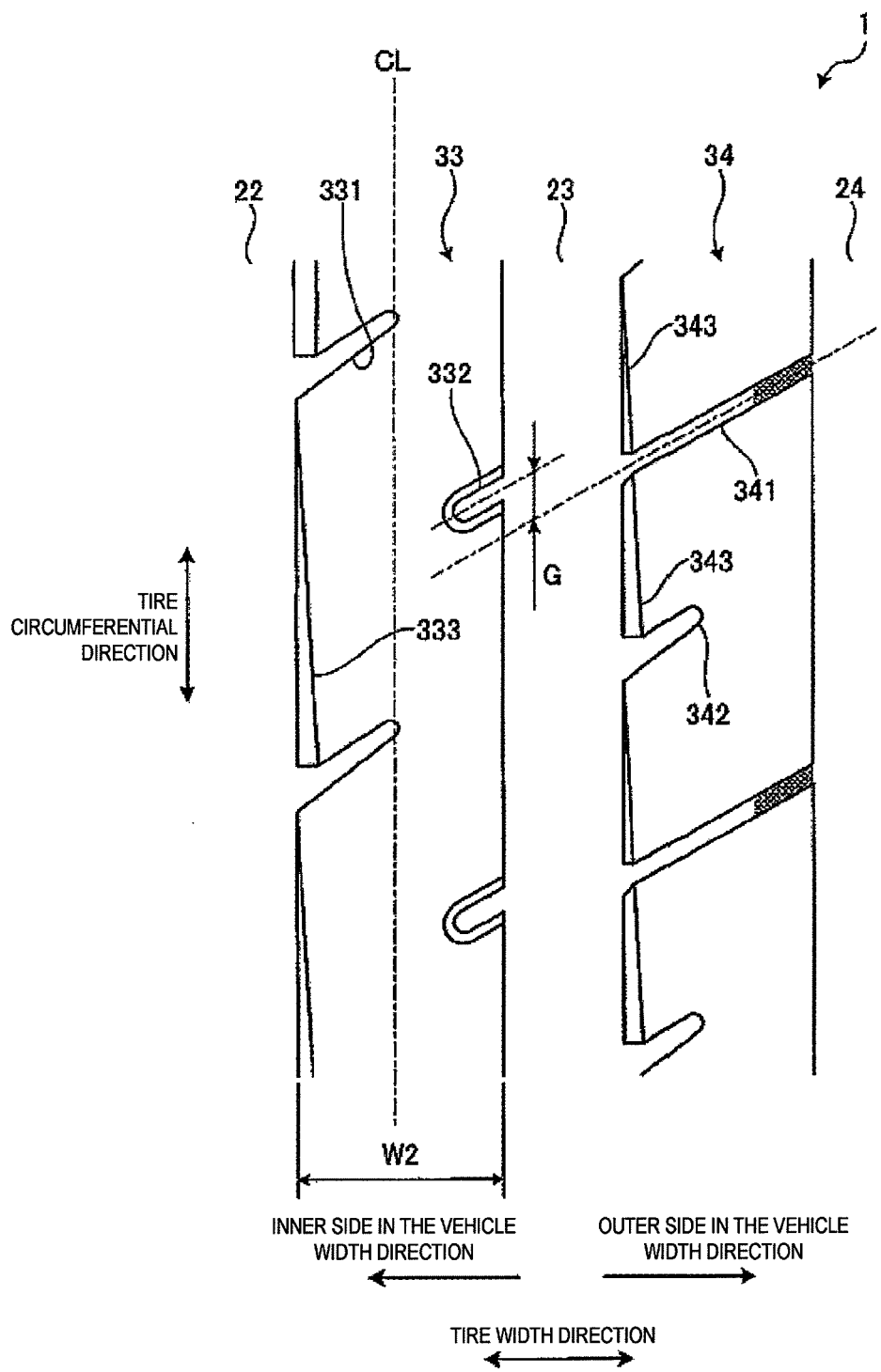
FIG. 7 is an explanatory drawing illustrating the center land portion and the outer side second land portion of the pneumatic tire depicted in FIG. 1.

FIG. 7 is an explanatory drawing illustrating the center land portion 33 and the outer side second land portion 34 of the pneumatic tire 1 depicted in FIG. 1.

In the pneumatic tire 1, the notch grooves 332 of the center land portion 33 preferably are positioned substantially on extended lines of the lug grooves 341 of the outer side second land portion 34 (see FIG. 7). As a result, water drainage from the notch grooves 332 of the center land portion 33 to the lug grooves 341 of the outer side second land portion 34 is promoted.

In this case, as illustrated in FIG. 7, the notch grooves 332 of the center land portion 33 may be disposed offset in the tire circumferential direction from the extended lines of the lug grooves 341 of the outer side second land portion 34. Specifically, a distance G in the tire circumferential direction between the notch groove 332 of the center land portion 33 and the extended line of the lug groove 341 of the outer side second land portion 34 is preferably within ±50%, and more preferably within ±20% of the width W2 of the center land portion 33. That is, provided that disposal is within the range described above, the notch grooves 332 of the center land portion 33 can be said to be substantially on the extended lines of the lug grooves 341 of the outer side second land portion 34.

Effects

As described above, the pneumatic tire 1 includes the three circumferential main grooves 21 to 23, the one circumferential narrow groove 24 that has the groove width Wd that is narrower than that of the circumferential main grooves 21 to 23, the one row of center land portion 33 partitioned and formed by the circumferential main grooves 21 to 23 and the circumferential narrow groove 24, the pair of left and right second land portions 32 and 34, and the pair of left and right shoulder land portions 31 and 35 in the tread portion (see FIG. 2). The circumferential narrow groove 24 is disposed at a position that partitions the outer side second land portion 34 and the outer side shoulder land portion 35. The center land portion 33 is a rib that is continuous in the tire circumferential direction, and the inner side second land portion 32 and the outer side second land portion 34 are rows of blocks divided in the tire circumferential direction by pluralities of the lug grooves 321 and 341. Additionally, the groove area ratio S2 of the center land portion 33, the groove area ratio S1 of the inner side second land portion 32, and the groove area ratio S3 of the outer side second land portion 34 have a relationship such that $S2<S3<S1$. Moreover, the groove width Wd of the circumferential narrow groove 24 and the maximum groove width Wmax of the other three circumferential main grooves 21 to 23 have a relationship such that $3.1 \leq Wmax/Wd \leq 5.0$.

With such a configuration described above, (1) the groove area ratio S2 of the center land portion 33, the groove area ratio S1 of the inner side second land portion 32, and the groove area ratio S3 of the outer side second land portion 34 have a relationship such that $S2<S3<S1$. Therefore, the rigidity of the center land portion 33 and the rigidity of the outer side second land portion 34 are increased, and the water drainage properties of the region that has the inner side second land portion 32 are enhanced. Furthermore, (2) in the configuration having the groove area ratios S1 to S3 described above, the groove width Wd of the circumferential narrow groove 24 and the maximum groove width Wmax of the other three circumferential main grooves 21 to 23 have a relationship such that $3.1 \leq Wmax/Wd \leq 5.0$. Therefore, the rigidity of the region that has the circumferential narrow groove 24 is increased. As a result, when the tire is mounted on a vehicle such that the region on the circumferential narrow groove 24 side is on the outer side in the vehicle width direction, there is an advantage in that both the dry performance and the wet performance of the tire are achieved.

Additionally, in the pneumatic tire 1, the inner side second land portion 32 includes the first lug grooves 321 that penetrate the inner side second land portion 32, and the second lug grooves 322 that are open to the edge portion on the inner side shoulder land portion 31 side of the inner side second land portion 32 and terminate within the inner side second land portion 32 (see FIG. 2). The plurality of the first lug grooves 321 and the plurality of the second lug grooves 322 are disposed so as to co-exist at a predetermined spacing in the tire circumferential direction. Additionally, the first lug grooves 321 have the raised bottom portions 3211 in the region from the edge portion on the center land portion 33 side of the inner side second land portion 32 to the predetermined position within the inner side second land portion 32 (see FIG. 3). With such a configuration, the first lug grooves 321 include the raised bottom portions 3211 at the end on the center land portion 33 side and, therefore, the rigidity of the center land portion 33 can be reinforced while ensuring the water drainage properties of the first lug grooves 321. Such a configuration is advantageous because both the dry performance and the wet performance of the tire can be achieved.

Additionally, in the pneumatic tire 1, the distance D1 in the tire width direction of the disposal region of the raised bottom portions 3211 and the width W1 of the inner side second land portion 32 have a relationship such that $0.30 \leq D1/W1 \leq 0.70$ (see FIG. 3). As a result, there is an advantage in that the disposal region of the raised bottom portions 3211 is made appropriate.

In the pneumatic tire 1 according to the present technology, the inner side second land portion 32 includes the sipes 323 that connect the second lug grooves 322 and the edge portion on the center land portion 33 side of the inner side second land portion 32 (see FIG. 3). With such a configuration, the sipes 323 extend in the tire width direction so as to extend the second lug grooves 322 and, thus, divide the inner side second land portion 32 in the tire circumferential direction. As a result, there is an advantage in that the wet performance is enhanced due to the edge effects of the sipes 323, without causing a decline in block rigidity.

In the pneumatic tire 1, the length D2 in the tire width direction of the second lug grooves 322 and the width W1 of the inner side second land portion 32 have a relationship such that $0.40 \leq D2/W1 \leq 0.60$ (see FIG. 3). With such a configuration, the length D2 of the second lug grooves 322 is made appropriate, which leads to the advantage of both the dry performance and the wet performance of the tire being achievable.

In the pneumatic tire 1, the center land portion 33 has the plurality of the notch grooves 332 in the edge portion on the outer side second land portion 34 side, and these notch grooves 332 have the chamfered portion 3321 that surrounds the groove opening portions of the notch grooves 332 (see FIG. 3). With such a configuration, the wet performance of the tire is enhanced due to the center land portion 33 having the Botch grooves 332. In this case, the wet performance of the tire is further enhanced by the notch grooves 332 having the chamfered portion 3321. On the other hand, with the configuration in which the notch grooves 332 have the chamfered portion 3321, the rigidity of the edge portion on the outer side second land portion 34 side is ensured. As a result, when the tire is mounted on a vehicle such that the region on the circumferential narrow groove 24 side is on the outer side in the vehicle width direction, there is an advantage in that both the dry performance and the wet performance of the tire are achieved.

In the pneumatic tire 1, the inner side second land portion 32 includes the plurality of notches 324 in the edge portion on the inner side shoulder land portion 31 side (see FIG. 3). With such a configuration, the groove cubic capacity of the circumferential main groove 21 is increased due to the notches 324, which leads to an enhancement in the wet performance of the tire. Additionally, the rigidity of the inner side second land portion 32 is high compared to a configuration in which the width of the circumferential main groove 21 is increased. Such a configuration is advantageous in that both tire dry performance and wet performance are achieved.

In the pneumatic tire 1, the center land portion 33 includes the lug grooves 331 that are open to the edge portion on the inner side second land portion 32 side and terminate within the center land portion 33 (see FIG. 3). Additionally, the lug grooves 331 are positioned substantially on the extended lines of the second lug grooves 322 of the inner side second land portion 32. With such a configuration, the lug grooves 331 of the center land portion 33 are positioned on the extended lines of the second lug grooves 322 that terminate within the inner side second land portion 32. Therefore, there is an advantage in that the wet performance of the tire is ensured.

In the pneumatic tire 1, the outer side shoulder land portion 35 includes the lug grooves 351 that extend in the tire width direction from the edge portion on the circumferential narrow groove 24 side beyond the tire ground contact edge T (see FIG. 6). The distance W4 in the tire width direction from the edge portion on the circumferential narrow groove 24 side of the outer side shoulder land portion 35 to the tire ground contact edge T, the groove width W5 of the lug groove 351 in a region from the edge portion on the circumferential narrow groove 24 side of the outer side shoulder land portion 35 to the distance D6 in the tire width direction, and the groove width W6 of the lug groove 351 in the tire ground contact edge T have relationships such that $0.40 \leq D6/W4 \leq 0.60$ and $0.55 \leq W5/W6 \leq 0.75$. With such a configuration, the lug grooves 351 of the outer side shoulder land portion 35 are open to the edge portion on the circumferential narrow groove 24 side and, thus, the water drainage properties of the tire are enhanced. Additionally, the lug grooves 351 have a narrowed groove width in a predetermined region (the region corresponding to the distance D6) of the opening on the circumferential narrow groove 24 side and, thus, the rigidity of the outer side shoulder land portion 35 is ensured. Such a configuration is advantageous in that both tire dry performance and wet performance are achieved.

In the pneumatic tire 1, the outer side second land portion 34 includes the lug grooves 341 that penetrate the outer side second land portion 34 (see FIG. 6). Additionally, the lug grooves 341 have the raised bottom portions 3411 that are disposed in the region from the edge portion on the outer side shoulder land portion 35 side of the outer side second land portion 34 to the predetermined position within the outer side second land portion 34. With such a configuration, the outer side second land portion 34 includes the lug grooves 341 and, thus, the water drainage properties of the tire are enhanced. Additionally, the lug grooves 341 have the raised bottom portions and, thus, the rigidity of the outer side second land portion 34 is ensured. Such a configuration is advantageous in that both tire dry performance and wet performance are achieved.

In the pneumatic tire 1, the center land portion 33 includes the notches 333 in the edge portion on the inner side second land portion 32 side (see FIG. 3). Additionally, the length L1 in the tire circumferential direction of the notches 333 of the center land portion 33 and the length L2 in the tire circumferential direction of the notches 324 of the inner side second land portion 32 have a relationship such that $0.45 \leq L2/L1 \leq 0.55$. With such a configuration, the inner side second land portion 32 and the center land portion 33 include the notches 324 and 333, respectively, and, thus, the groove cubic capacity is increased and the wet performance of the tire is enhanced. Additionally, the length L2 of the notches 324 of the inner side second land portion 32 is set to be short and, thus, the rigidity of the inner side second land portion 32 that has a large groove area ratio S1 is ensured. Such a configuration is advantageous in that both tire dry performance and wet performance are achieved.

In the pneumatic tire 1, the notch grooves 332 of the center land portion 33 are positioned substantially on the extended lines of the lug grooves 341 of the outer side second land portion 34 (see FIG. 7). With such a configuration, water drainage from the notch groove 332 of the center land portion 33 to the lug grooves 341 of the outer side second land portion 34 is promoted. This leads to the advantage of enhancing the wet performance of the tire.

The pneumatic tire 1 has the indicator designating the mounting direction on a vehicle wherein the circumferential narrow groove 24 side is on the outer side in the vehicle width direction (see FIG. 2). With such a configuration, the region on the circumferential narrow groove 24 side having high rigidity is disposed on the outer side in the vehicle width direction and, thus, the dry performance of the tire is enhanced. Additionally, the inner side second land portion 32 having the large groove area ratio S1 is disposed on the inner side in the vehicle width direction and, thus, the wet performance of the tire is enhanced. Such a configuration is advantageous in that both tire dry performance and wet performance are achieved.

EXAMPLES

Figure 9:
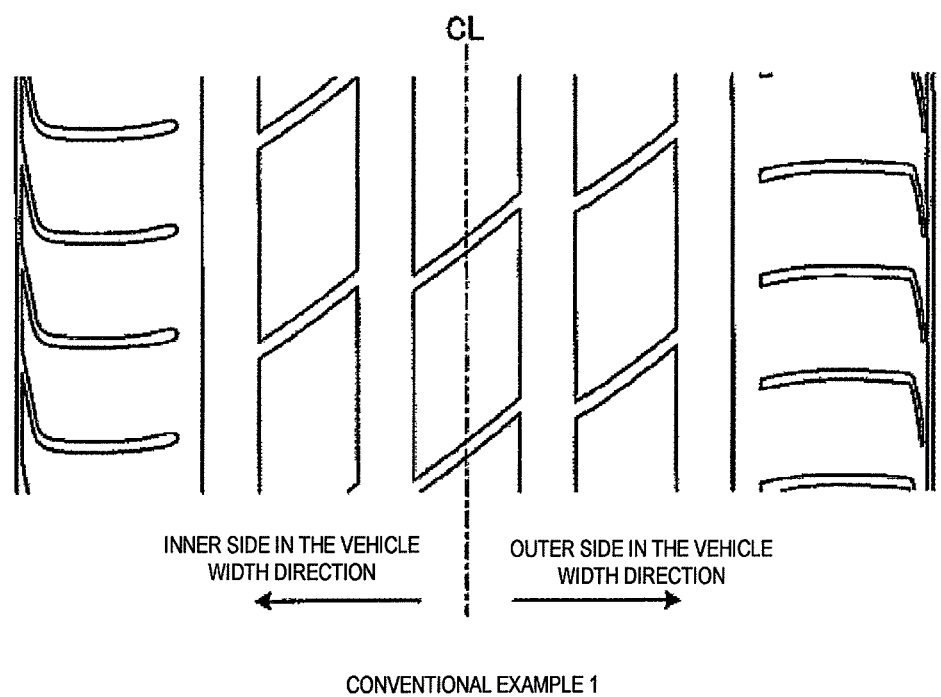
FIG. 9 is a plan view illustrating a tread portion of a pneumatic tire of Conventional Example 1.
Figure 10:
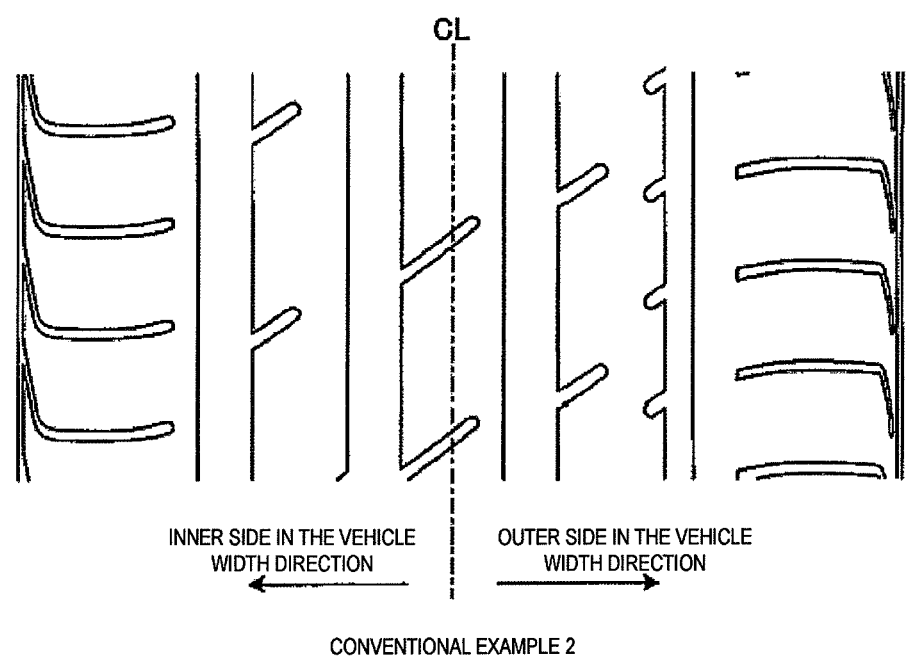
FIG. 10 is a plan view illustrating a tread portion of a pneumatic tire of Conventional Example 2.

FIGS. 8a-8b include a table showing the results of performance testing of pneumatic tires according to embodiments of the present technology. FIGS. 9 and 10 are plan views illustrating treads of pneumatic tires of Conventional Examples 1 and 2.

In the performance testing, a plurality of mutually differing pneumatic tires were evaluated for (1) dry performance, and (2) wet performance (see FIGS. 8*a*-8*b*). In the performance tests, pneumatic tires with a tire size of 275/35R20 were assembled on a rim having a rim size of 20×9JJ (OE designated standard rim); and an air pressure of 260 kPa and a maximum load defined by JATMA were applied to these pneumatic tires. The pneumatic tires were mounted on a full-size sedan (not of Japanese make) used as a test vehicle.

(1) In the evaluations for dry performance, the test vehicle was driven at a speed of from 60 km/h to 100 km/h on a flat circuit test course. Then, the test driver performed a sensory evaluation regarding steering while lane changing and cornering and stability while traveling forward. Results of the evaluations were indexed and the index value of the pneumatic tire of Conventional Example 2 was set as the standard score (100). Higher scores were preferable.

(2) In the evaluations for wet performance, the test vehicle was driven on a wet road surface, and the braking distance from an initial speed of 100 km/h using an ABS (anti-locked braking system) was measured. Evaluations were performed by indexing the measurement results with Conventional Example 1 as the standard score (100). In the evaluation results, higher scores were preferable.

The pneumatic tire 1 of Working Example 1 had the tread pattern depicted in FIG. 2, and was mounted on the vehicle on that the region on the circumferential narrow groove 24 side was on the outer side in the vehicle width direction. Additionally, the groove area ratio S2 of the center land portion 33, the groove area ratio S1 of the inner side second land portion 32, and the groove area ratio S3 of the outer side second land portion. 34 were configured such that S1=12.5, S2=9.3, and S3=10.8; and had relationships such that S3/S2=1.16, and S1/S3=1.16. Moreover, the groove width Wd of the circumferential narrow groove 24 was configured such that Wd=5.8 mm. The widths W1 to W6 in FIGS. 3 and 6 were configured such that W1=27.5 mm, W2=30.4 mm, W3=28.0 mm, W4=56.0 mm, and W6=3.9 mm. The pneumatic tires 1 of Working Examples 2 to 14 are modified examples of the pneumatic tire 1 of Working Example 1.

The pneumatic tires of the Conventional Examples 1 and 2 had the tread patterns illustrated in FIGS. 9 and 10, respectively.

From the test results, it is clear that both the dry performance and the wet performance of the tire can be achieved with the pneumatic tires 1 of Working Examples 1 to 14.

What is claimed is:

1. A pneumatic tire comprising:
three circumferential main grooves;
one circumferential narrow groove having a groove width that is less than that of the circumferential main grooves; and
one row of center land portion, a pair of left and right second land portions, and a pair of left and right shoulder land portions partitioned and formed by the circumferential main grooves and the circumferential narrow groove in a tread portion, wherein
when the second land portion and the shoulder land portion in a first region demarcated by the center land portion are referred to as an inner side second land portion and an inner side shoulder land portion, and the second land portion and the shoulder land portion in a second region are referred to as an outer side second land portion and an outer side shoulder land portion,
the circumferential narrow groove is disposed at a position that partitions the outer side second land portion and the outer side shoulder land portion,
the center land portion is a rib that is continuous in a tire circumferential direction, the inner side second land portion and the outer side second land portion are rows of blocks divided in the tire circumferential direction by a plurality of lug grooves,
a groove area ratio S2 of the center land portion, a groove area ratio S1 of the inner side second land portion, and a groove area ratio S3 of the outer side second land portion have a relationship such that S2<S3<S1, $1.05 \leq S3/S2$ and $1.05 \leq S1/S3$, and
a groove width Wd of the circumferential narrow groove and a maximum groove width Wmax of the other three circumferential main grooves have a relationship such that $3.1 \leq Wmax/Wd \leq 5.0$.

2. The pneumatic tire according to claim 1, wherein
the inner side second land portion comprises a first lug groove penetrating the inner side second land portion and a second lug groove that is open to an edge portion on the inner side shoulder land portion side of the inner side second land portion and that terminates within the inner side second land portion,
a plurality of the first lug grooves and a plurality of the second lug grooves are disposed so as to co-exist at a predetermined spacing in the tire circumferential direction, and
the first lug grooves comprise raised bottom portions in a region from an edge portion on the center land portion side of the inner side second land portion to a predetermined position within the inner side second land portion.

3. The pneumatic tire according to claim 2, wherein a distance D1 in a tire width direction of the disposal region of the raised bottom portions and a width W1 of the inner side second land portion have a relationship such that $0.30 \leq D1/W1 \leq 0.70$.

4. The pneumatic tire according to claim 2, wherein the inner side second land portion comprises sipes connecting the second lug grooves and the edge portion on the center land portion side of the inner side second land portion.

5. The pneumatic tire according to claim 2, wherein a length D2 in the tire width direction of the second lug grooves and the width W1 of the inner side second land portion have a relationship such that $0.40 \leq D2/W1 \leq 0.60$.

6. The pneumatic tire according to claim 2, wherein the center land portion comprises lug grooves that are open to the edge portion on the inner side second land portion side and that terminate within the center land portion, and said lug grooves are positioned substantially on extended lines of the second lug grooves of the inner side second land portion.

7. The pneumatic tire according to claim 1, wherein the center land portion comprises a plurality of notch grooves in an edge portion on the outer side second land portion side, and said notch grooves comprise chamfered portions surrounding groove opening portions of said notch grooves.

8. The pneumatic tire according to claim 1, wherein the inner side second land portion comprises a plurality of notches in the edge portion on the inner side shoulder land portion side.

9. The pneumatic tire according to claim 8, wherein: the center land portion comprises notches in the edge portion on the inner side second land portion side, and a length L1 in the tire circumferential direction of the notches in the center land portion and a length L2 in the tire circumferential direction of the notches in the inner side second land portion have a relationship such that $0.45 \leq L2/L1 \leq 0.55$.

10. The pneumatic tire according to claim 1, wherein the outer side shoulder land portion comprises lug grooves extending in the tire width direction from the edge portion on the circumferential narrow groove side beyond a tire ground contact edge, and a distance W4 in the tire width direction from the edge portion on the circumferential narrow groove side of the outer side shoulder land portion to the tire ground contact edge, a groove width W5 of the lug grooves in a region from the edge portion on the circumferential narrow groove side of the outer side shoulder land portion to a distance D6 in the tire width direction, and a groove width W6 of the lug grooves in the tire ground contact edge have relationships such that $0.40 \leq D6/W4 \leq 0.60$ and $0.55 \leq W5/W6 \leq 0.75$.

11. The pneumatic tire according to claim 1, wherein: the outer side second land portion comprises lug grooves penetrating the outer side second land portion, and said lug grooves comprise raised bottom portions in a region from an edge portion on the outer side shoulder land portion side of the outer side second land portion to a predetermined position within the outer side second land portion.

12. The pneumatic tire according to claim 11, wherein notch grooves are positioned substantially on extended lines of the lug grooves of the outer side second land portion.

13. The pneumatic tire according to claim 1, further comprising an indicator designating a mounting direction on a vehicle wherein the circumferential narrow groove side is on the outer side in the vehicle width direction.

14. The pneumatic tire according to claim 1, wherein: the center land portion comprises a plurality of notch grooves in an edge portion on the outer side second land portion side, and
   the notch grooves are open to the edge portion on the outer side second land portion side of the center land portion and terminate within the center land portion.

15. The pneumatic tire according to claim 14, wherein a length D3 in the tire width direction of the notch grooves and a width W2 of the center land portion have a relationship such that $0.15 \leq D3/W2 \leq 0.35$.

16. The pneumatic tire according to claim 14, wherein the notch grooves comprise chamfered portions surrounding groove opening portions of said notch grooves, and a groove width Ws of the notch grooves and a width Wh of the chamfered portions have a relationship such that $2.0 \leq Wh/Ws \leq 3.0$.

17. The pneumatic tire according to claim 16, wherein the chamfered portions are formed throughout an entire periphery of the notch grooves along the groove opening portions and surround terminating portions of the notch grooves in an arc-like configuration.

18. A pneumatic tire comprising:
three circumferential main grooves;
one circumferential narrow groove having a groove width that is less than that of the circumferential main grooves; and
one row of center land portion, a pair of left and right second land portions, and a pair of left and right shoulder land portions partitioned and formed by the circumferential main grooves and the circumferential narrow groove in a tread portion, wherein
when the second land portion and the shoulder land portion in a first region demarcated by the center land portion are referred to as an inner side second land portion and an inner side shoulder land portion, and the second land portion and the shoulder land portion in a second region are referred to as an outer side second land portion and an outer side shoulder land portion,
the circumferential narrow groove is disposed at a position that partitions the outer side second land portion and the outer side shoulder land portion,
the center land portion is a rib that is continuous in a tire circumferential direction, the inner side second land portion and the outer side second land portion are rows of blocks divided in the tire circumferential direction by a plurality of lug grooves,
a groove area ratio S2 of the center land portion, a groove area ratio S1 of the inner side second land portion, and a groove area ratio S3 of the outer side second land portion have a relationship such that S2<S3<S1,
a groove width Wd of the circumferential narrow groove and a maximum groove width Wmax of the other three circumferential main grooves have a relationship such that $3.1 \leq Wmax/Wd \leq 5.0$, and
the center land portion comprises a plurality of notch grooves in an edge portion on the outer side second land portion side, and said notch grooves comprise chamfered portions surrounding groove opening portions of said notch grooves.

19. A pneumatic tire comprising:
three circumferential main grooves;
one circumferential narrow groove having a groove width that is less than that of the circumferential main grooves; and
one row of center land portion, a pair of left and right second land portions, and a pair of left and right shoulder land portions partitioned and formed by the circumferential main grooves and the circumferential narrow groove in a tread portion, wherein
when the second land portion and the shoulder land portion in a first region demarcated by the center land portion are referred to as an inner side second land portion and an inner side shoulder land portion, and the second land portion and the shoulder land portion in a second region are referred to as an outer side second land portion and an outer side shoulder land portion,
the circumferential narrow groove is disposed at a position that partitions the outer side second land portion and the outer side shoulder land portion,
the center land portion is a rib that is continuous in a tire circumferential direction, the inner side second land portion and the outer side second land portion are rows of blocks divided in the tire circumferential direction by a plurality of lug grooves,
a groove area ratio S2 of the center land portion, a groove area ratio S1 of the inner side second land portion, and a groove area ratio S3 of the outer side second land portion have a relationship such that S2<S3<S1,
a groove width Wd of the circumferential narrow groove and a maximum groove width Wmax of the other three circumferential main grooves have a relationship such that $3.1 \leq Wmax/Wd \leq 5.0$,
the outer side shoulder land portion comprises lug grooves extending in the tire width direction from the edge portion on the circumferential narrow groove side beyond a tire ground contact edge, and
a distance W4 in the tire width direction from the edge portion on the circumferential narrow groove side of the outer side shoulder land portion to the tire ground contact edge, a groove width W5 of the lug grooves in a region from the edge portion on the circumferential narrow groove side of the outer side shoulder land portion to a distance D6 in the tire width direction, and a groove width W6 of the lug grooves in the tire ground contact edge have relationships such that $0.40 \leq D6/W4 \leq 0.60$ and $0.55 \leq W5/W6 \leq 0.75$.

\* \* \* \* \*